US012776060B2

(12) United States Patent
Lv

(10) Patent No.: US 12,776,060 B2
(45) Date of Patent: Oct. 27, 2026

(54) METHOD AND APPARATUS FOR SPATIAL LOCALIZATION

(71) Applicant: BEIJING UNICORN TECHNOLOGY CO., LTD., Beijing (CN)

(72) Inventor: Xianwei Lv, Beijing (CN)

(73) Assignee: BEIJING UNICORN TECHNOLOGY CO., LTD., Beijing (CN)

( * ) Notice: Subject to any disclaimer, the term of this patent is extended or adjusted under 35 U.S.C. 154(b) by 264 days.

(21) Appl. No.: 18/685,907

(22) PCT Filed: Aug. 24, 2022

(86) PCT No.: PCT/CN2022/114388

§ 371 (c)(1),
(2) Date: Feb. 23, 2024

(87) PCT Pub. No.: WO2023/025175

PCT Pub. Date: Mar. 2, 2023

(65) Prior Publication Data

US 2025/0182314 A1 Jun. 5, 2025

(30) Foreign Application Priority Data

Aug. 25, 2021 (CN) ........................ 202110980667.2

(51) Int. Cl.
*G06T 7/70* (2017.01)
*G06T 7/20* (2017.01)
(Continued)

(52) U.S. Cl.
CPC .................. *G06T 7/70* (2017.01); *G06T 7/20* (2013.01); *G06T 7/593* (2017.01); *G06T 7/75* (2017.01); *G06T 7/85* (2017.01); *G06T 17/00* (2013.01); *G06T 19/00* (2013.01); *G06V 10/751* (2022.01); *G06T 2207/10012* (2013.01); *G06T 2207/30244* (2013.01)

(58) Field of Classification Search
CPC .. G06T 7/20; G06T 7/593; G06T 7/70; G06T 7/75; G06T 7/85; G06T 17/00;
(Continued)

(56) References Cited

U.S. PATENT DOCUMENTS 10,311,833 B1 * 6/2019 Qiu ........................ G09G 5/003
2015/0254861 A1 * 9/2015 Chornenky ......... H04M 1/0264
348/135

(Continued)

FOREIGN PATENT DOCUMENTS

CN 103793705 A 5/2014
CN 109214980 A 1/2019

(Continued)

OTHER PUBLICATIONS

Grundmann et al., "A Probabilistic Measurement Model for Local Interest Point Based 6 DOF Pose Estimation", The 2010 IEEE/ RSJ International Conference on Intelligent Robots and Systems, Oct. 18-22, 2010, pp. 4572-4577. (Year: 2010).*

(Continued)

*Primary Examiner* — Jennifer Mehmood
*Assistant Examiner* — Jose M Torres
(74) *Attorney, Agent, or Firm* — K&L Gates LLP

(57) ABSTRACT

The present disclosure provides a method and apparatus for spatial localization. The method includes: capturing a first image of a second device, the first image includes 2D points of the second device and descriptors corresponding to the 2D points; performing feature point matching between the 2D points and 3D points on a 3D model of the second device, to obtain a first correspondence between at least three non-collinear 2D points and the 3D points on the 3D model of the second device, the 3D model of the second device includes the 3D points and descriptors corresponding to the 3D points; determining a localization of the 3D model
(Continued)

of the second device in a world coordinate system according to the localization of the second device and a second correspondence between the second device and the 3D model; and determining the pose of the first device in the world coordinate system.

20 Claims, 7 Drawing Sheets

(51) Int. Cl.

| | |
|---|---|
| ***G06T 7/593*** | (2017.01) |
| ***G06T 7/73*** | (2017.01) |
| ***G06T 7/80*** | (2017.01) |
| ***G06T 17/00*** | (2006.01) |
| ***G06T 19/00*** | (2011.01) |
| ***G06V 10/75*** | (2022.01) . |

(58) Field of Classification Search

CPC ........... G06T 19/00; G06T 2207/10012; G06T 2207/30244; G06V 10/751

See application file for complete search history.

(56) References Cited

U.S. PATENT DOCUMENTS

| | | | | |
|---|---|---|---|---|
| 2018/0329516 | A1* | 11/2018 | Steedly | G06F 3/011 |
| 2019/0206116 | A1* | 7/2019 | Xu | G06T 15/205 |
| 2020/0250850 | A1* | 8/2020 | Chakravarty | G06T 7/579 |
| 2021/0142508 | A1 | 5/2021 | Azimi et al. | |
| 2021/0150755 | A1* | 5/2021 | Gao | G06T 7/73 |
| 2021/0191421 | A1 | 6/2021 | Guo et al. | |
| 2021/0256766 | A1* | 8/2021 | Muhlethaler | G06F 18/22 |
| 2023/0098910 | A1* | 3/2023 | Ma | G02B 27/017 345/8 |
| 2023/0401742 | A1* | 12/2023 | Urfalioglu | G06T 7/74 |

FOREIGN PATENT DOCUMENTS

| | | | |
|---|---|---|---|
| CN | 110298877 | A | 10/2019 |
| CN | 110555880 | A | 12/2019 |
| CN | 113658278 | A | 11/2021 |
| EP | 3622373 | B1 | 6/2021 |
| WO | 2021057744 | A1 | 4/2021 |

OTHER PUBLICATIONS

ISR received in PCT/CN2022/114388; mailed Oct. 26, 2022.

The First Office Action received in the counterpart Chinese application 202110980667.2, mailed on Oct. 18, 2024.

The extended European search report received in the counterpart European application 22860521.8, mailed on Nov. 15, 2024.

David Chi Chung Tam et al: "A Real Time Augmented Reality System Using GPU Acceleration", Computer and Robot Vision (CRV), 2012 Ninth Conference On, IEEE, May 28, 2012 (May 28, 2012), pp. 101-108, XP032456220.

* cited by examiner

METHOD AND APPARATUS FOR SPATIAL LOCALIZATION

CROSS-REFERENCE TO RELATED PATENT APPLICATIONS

The present disclosure is a national phase entry under 35 U.S.C. § 371 of International Application PCT/CN2022/114388, filed on Aug. 24, 2022, which claims the benefit of and priority to Chinese Patent Application No. 202110980667.2, filed on Aug. 25, 2021, both of which are hereby incorporated by reference in their entireties for all purposes.

FIELD

The present disclosure relates to the field of information technology, specifically, to a method and apparatus for spatial localization.

BACKGROUND

With rapid development of various technologies such as computers and communications, augmented reality (AR) and other technologies have also developed rapidly. Specifically, in the AR technology, computer technology can be used to apply virtual information to the real world, that is, to superimpose a real scene and a virtual image (e.g., a virtual object, a virtual scene, etc.) in the same screen in real time, so that human eyes see a mixed image of the real scene and the virtual image simultaneously, thereby achieving an augmented reality effect.

The user can interact with a virtual object in the AR scene by means of an interactive device to produce an expected effect. For example, users can move the interactive device, and the spatial movement of the interactive device can be converted into the movement of the virtual object in the AR scene, thereby achieving the purpose of controlling the virtual object. Therefore, it is necessary to determine the spatial localization of the interactive device during the interaction process of the AR scene. The precise determination of the spatial localization of the interactive device has become an urgent problem to be solved.

SUMMARY

In view of the foregoing, the present disclosure provides a method and apparatus for spatial localization.

According to an aspect of the present disclosure, a method for spatial localization is provided, the method is executed by a first device, and the method includes: capturing a device image of a second device, the device image includes 2D points of the second device and descriptors corresponding to the 2D points; performing feature point matching between the 2D points of the second device and 3D points on a 3D model of the second device using descriptors corresponding to the 3D points on the 3D model of the second device and the descriptors corresponding to the 2D points, to obtain a first correspondence between at least three non-collinear 2D points of the second device and the 3D points on the 3D model of the second device, the 3D model of the second device includes 3D points and descriptors corresponding to the 3D points; determining a localization of the 3D model of the second device in a world coordinate system according to a localization of the second device in the world coordinate system and a second correspondence between the second device and the 3D model; and determining a pose of the first device in the world coordinate system according to the localization of the 3D model of the second device in the world coordinate system and the first correspondence.

According to another aspect of the present disclosure, an electronic device is also provided, which includes at least one processor and a memory, the memory stores instructions which, when executed by the at least one processor, cause the at least one processor to perform the above method for spatial localization.

According to another aspect of the present disclosure, a nonvolatile machine-readable storage medium is also provided, which stores executable instructions which, when executed, cause the machine to perform the above method for spatial localization.

BRIEF DESCRIPTION OF THE DRAWINGS

Further understanding of the essence and advantages of the present disclosure can be achieved by referring to the accompanying drawings below. In the accompanying drawings, similar components or features may have the same reference sign.

DETAILED DESCRIPTION OF THE DISCLOSURE

Figure 1:
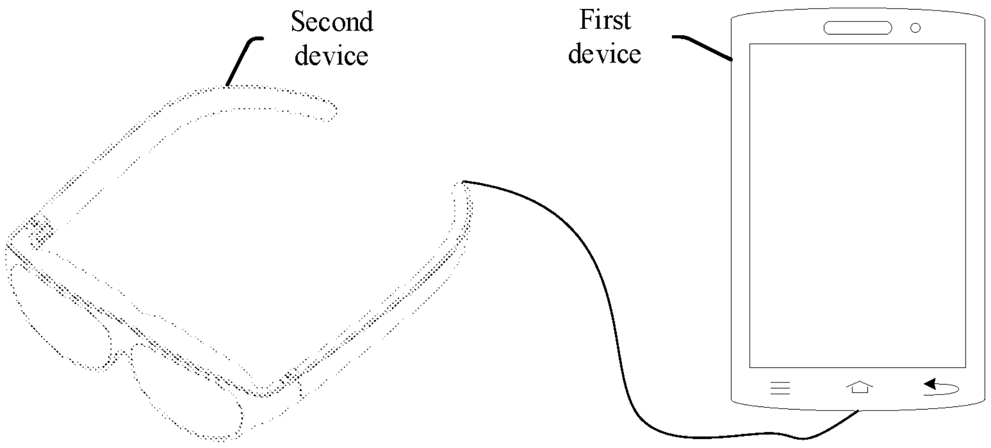
FIG. 1 shows a schematic diagram of an example of an application scene of a method for spatial localization according to the present disclosure.

The subjects described herein will be discussed below with reference to exemplary implementations. It should be understood that these implementations are discussed just to enable those skilled in the art to better understand and implement the subjects described herein, and are not intended to limit the scope of protection, applicability or examples set forth in the present disclosure. Functions and arrangements of elements discussed can be changed without departing from the scope of protection of the present disclosure. In examples, various processes or components may be omitted, substituted or added, as needed. Furthermore, features described with respect to some examples may also be combined in other examples.

As used herein, the term "includes" and its variants denote open-ended terms, meaning "including but not limited to". The term "based on" means "at least partially based on". The terms "one embodiment" and "an embodiment" denote "at least one embodiment". The term "another embodiment" denotes "at least one other embodiment". The terms "first", "second" and the like may refer to different or same objects. Other definitions can be included below, whether explicitly or implicitly. The definition of a term is consistent throughout the description unless explicitly indicated in the context.

In the current application of Augmented Reality (AR) technology, it is possible for a terminal device, e.g., a mobile terminal such as a mobile phone, a personal computer, a tablet computer, etc., to be connected to AR glasses, and the terminal device can serve as a handle for controlling the virtual objects displayed through the AR glasses. The terminal device can be moved in space to perform corresponding operation on virtual objects displayed in the AR glasses, such as positional movement, posture changes, interface switching, selection, deselection, entering, exiting, and more. Based on this, the spatial localization of the terminal device is crucial in an AR scene, directly impacting the interaction with virtual objects within the AR scene.

Currently, the terminal device performs attitude algorithm through a built-in IMU (Inertia Measurement Unit). IMUs generally used in consumer products can only realize the functions of 3DOF (degree of freedom), which only includes yaw, pitch, and roll. Based on this, the terminal device can only perform attitude algorithm using the three degrees of freedom: yaw, pitch, and roll. The three degrees of freedom, yaw, pitch, and roll, have certain limitations. If the IMU is solely relied upon for achieving 6DOF spatial localization, it may lead to inaccurate spatial localization of the terminal device, subsequently impacting the interaction with virtual objects within the AR scene.

In view of the foregoing, the present disclosure provides a method and apparatus for spatial localization. In this method, a first image of a second device is captured, and the first image may include 2D points of the second device and descriptors corresponding to the 2D points. Feature point matching may be performed between the 2D points of the second device and 3D points on a 3D model of the second device using descriptors corresponding to the 3D points on the 3D model of the second device and the descriptors corresponding to the 2D points, to obtain a first correspondence between at least three non-collinear 2D points of the second device and the 3D points on the 3D model of the second device. The 3D model of the second device may include 3D points and descriptors corresponding to the 3D points. A localization of the 3D model of the second device in a world coordinate system can be determined according to the localization of the second device in the world coordinate system and a second correspondence between the second device and the 3D model. The pose of the first device in the world coordinate system can be determined according to the localization of the 3D model of the second device in the world coordinate system and the first correspondence. Using the technical solution of the present disclosure, the spatial localization accuracy of the first device is improved. For example, the "first image" above can also be referred to as the "device image".

The present disclosure further provides another method for localizing a first device. In this method, a device image of a second device is captured by a first device, and the device image includes 2D points of the second device and descriptors corresponding to the 2D points. Feature point matching is performed between the 2D points of the second device and 3D points on a 3D model of the second device using descriptors corresponding to the 3D points on the 3D model of the second device and descriptors corresponding to the 2D points, to obtain a first correspondence between the 2D points of the second device and the 3D points on the 3D model of the second device. The first pose of the first device in the 3D model coordinate system of the second device is calculated according to the first correspondence. A pose of the 3D model of the second device in a world coordinate system is determined according to the pose of the second device in the world coordinate system and a second correspondence between the second device and the 3D model. The second pose of the first device in the world coordinate system is determined according to the pose of the 3D model of the second device in the world coordinate system and the first pose.

The present disclosure further provides a method for determining a pose of a handheld device. The handheld device is communicatively connected to a head-mounted device, and is configured to provide virtual objects to be displayed to the head-mounted device and to control the virtual objects displayed by the head-mounted device. In this method, a first image of the head-mounted device is captured by the handheld device, and the first image includes 2D points of the head-mounted device and descriptors corresponding to the 2D points. Feature point matching is performed between the 2D points of the head-mounted device and 3D points on the 3D model of the head-mounted device using descriptors corresponding to the 3D points on the 3D model of the head-mounted device and the descriptors corresponding to the 2D points, to obtain a first correspondence between at least three non-collinear 2D points of the head-mounted device and the 3D points on the 3D model of the head-mounted device. The 3D model of the head-mounted device includes the 3D points and the descriptors corresponding to the 3D points. A pose of the 3D model of the head-mounted device in a world coordinate system is determined according to a pose of the head-mounted device in the world coordinate system and a second correspondence between the head-mounted device and the 3D model. The pose of the first device in the world coordinate system is determined according to the pose of the 3D model of the head-mounted device in the world coordinate system and the first correspondence.

FIG. 1 shows a schematic diagram of an example of an application scene of the method for spatial localization according to the present disclosure.

As shown in FIG. 1, the application scene of the method for spatial localization includes at least a second device and a first device. The second device may be communicatively connected to the first device.

The second device is capable of determining its own spatial localization in a global coordinate system, which may be a position or a pose. The second device may acquire its spatial localization by means of SLAM (simultaneous localization and mapping), Motion Capture System, or Outside-in Tracking. Where the second device possesses the function of SLAM, it may include at least one camera and at least one IMU. In an example, the second device may include a head-mounted device, which is configured to display the virtual objects provided by the first device. For example, the second device may include smart glasses, e.g., AR glasses, virtual reality (VR) glasses, etc.

It can be understood that the term “position” used herein can be denoted using a space rectangular coordinate system, and the term “pose” used herein describes the position and orientation of an object, for example, the orientation is denoted with Euler Angles, Quaternions, etc.

The first device may be a terminal device provided with a photographic device for capturing images. The first device may include a handheld device, e.g., a mobile phone, or a personal computer, a tablet computer, etc. The handheld device may be configured to control the virtual objects displayed by the head-mounted device and includes a photographic device for capturing a first image.

An executor of the method for spatial localization provided in the present disclosure may be the second device or the first device. The method may also be performed jointly by the second device and the first device. For example, in an application scene of a mobile phone being connected to AR glasses, the method for spatial localization may be performed by the mobile phone, so that the computing power of AR glasses is saved, and the power consumption of AR glasses is reduced. The following is an example with the second device being AR glasses and the first device being a mobile phone.

Figure 2:
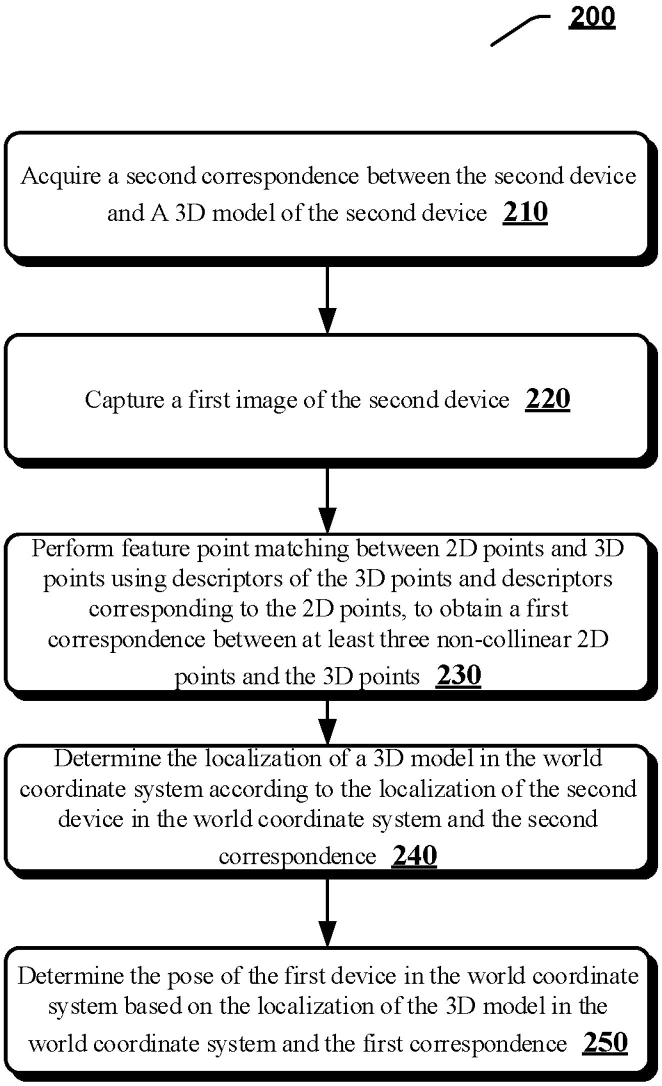
FIG. 2 shows a flow diagram of an example of a method for spatial localization according to the present disclosure.

FIG. 2 shows a flow diagram of an example 200 of a method for spatial localization according to the present disclosure. The method for spatial localization shown in FIG. 2 may be performed by the first device.

As shown in FIG. 2, in 210, a second correspondence between the second device and the 3D model of the second device is acquired.

In the present disclosure, the 3D model may include 3D points and descriptors corresponding to the 3D points. The descriptors are descriptive information of the individual feature points and may be used to distinguish the individual feature points, thereby determining corresponding feature points according to the individual descriptors. In the present disclosure, the descriptors may be 3D descriptors or 2D descriptors.

Figure 3:
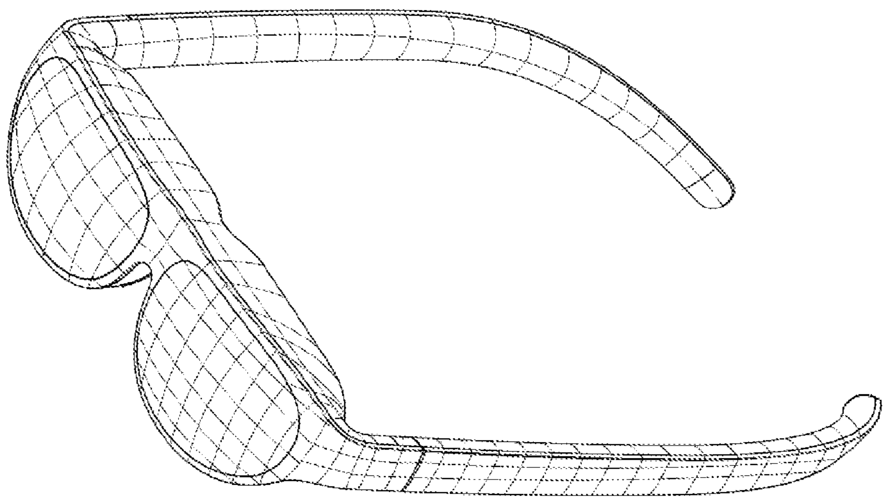
FIG. 3 shows a schematic diagram of an example of a 3D model of a second device according to the present disclosure.

The 3D model of the second device may consist of individual 3D points, and the 3D model consists of all the 3D points may be used to characterize the second device. FIG. 3 shows a schematic diagram of an example of the 3D model of the second device according to the present disclosure. For example, the second device is AR glasses, and the formed 3D model is as shown in FIG. 3, which characterizes the AR glasses.

The second device can be characterized based on the 3D model. Respective 3D points on the 3D model and respective feature points on the second device correspond to each other in a one to one manner. For each one-to-one correspondence between a 3D point and a feature point, the position of that 3D point on the 3D model is identical to the position of the corresponding feature point on the second device. For example, if the second device is AR glasses, one feature point is right located in the middle of the nose bridge of the AR glasses, one 3D point is right located in the middle of the nose bridge of the AR glasses characterized by the 3D model, then the feature point on the AR glasses and the 3D point on the 3D model are in a one-to-one correspondence.

The second correspondence may be used to characterize the mapping relationship between the second device and the 3D model. For example, a one-to-one correspondence between 3D points and feature points may constitute a second correspondence. The determined second correspondence may include the second correspondence between all or part of the feature points on the AR glasses and the 3D points on the 3D model.

In the present disclosure, the 3D model of the second device may respond to a 3D model coordinate system, which may be used for determining the relative position of the individual 3D points on the 3D model. The 3D model coordinate system may be created based on a 3D model, and the 3D model coordinate system may be a space rectangular coordinate system.

The 3D model coordinate system may be created with the second device as a reference. A fixed position point (hereinafter referred to as the first position point) on the second device may be used as a position point (hereinafter referred to as the second position point) in the 3D model coordinate system, then a 3D model coordinate system may be created based on the correspondence between the two position points. In an example, the origin of the 3D model coordinate system is determined as the second position point.

In an example, the sensor in the second device may be determined as the first position point. The sensor may be the sensor of the second device for executing SLAM, for example, an IMU, a camera, or the like. In another example, other position points on the second device that have a fixed relative position relationship with the sensor may be determined as the first position point.

In an example of the present disclosure, the 3D model of the second device may be pre-created, and the device for which a 3D model has been pre-created may be a device other than the second device.

In another example of the present disclosure, the 3D model of the second device may be created from the second device, and the 3D model may be created for the second device in real time. When it is necessary to create a 3D model of the second device, a fixed position point on the second device may be determined first as a position point in the 3D model coordinate system. For example, the camera on the second device may be designated as the origin of the 3D model coordinate system. Then, a 3D model coordinate system is established based on the determined position point, and a 3D model of the second device is created in the 3D model coordinate system by using the sensor on the second device.

The created 3D model may be pre-stored in the second device or in the first device, and may also be pre-stored in other devices, servers or clouds that communicate with the second device and/or the first device. When it is necessary to use the 3D model of the second device, it may be acquired from the corresponding storage.

It can be understood that the step 210 of acquiring a second correspondence between the second device and the 3D model of the second device may not be a fixed step for performing the method of the present application.

In an example of acquiring a second correspondence, the second correspondence may be pre-created, and the created second correspondence may be pre-stored in the second device or in the first device, and may also be pre-stored in other devices, servers or clouds that communicate with the second device and/or the first device. In this example, the second correspondence may be acquired directly from the corresponding storage.

In another example of acquiring a second correspondence, the second correspondence may be created in real time. In this example, when it is necessary to acquire a second correspondence, feature points on the second device and 3D points on the 3D model may be determined first, and then a correspondence between them may be established, which is the second correspondence.

In 220, a first image of the second device is captured.

In the present disclosure, the first image of the second device captured by the first device may include the complete second device or a part of the second device. The first image may include 2D points of the second device and descriptors corresponding to the 2D points, and the individual image points of the first image may be denoted by the 2D points and the descriptors corresponding to the 2D points. Based on this, the second device in the first image may be composed of a plurality of 2D points.

In the present disclosure, the first image of the second device and the 3D model of the second device are both used to represent the same object (i.e., the second device), then the 2D points on the second device in the first image may respond to the 3D points on the 3D model. The corresponding 2D point and 3D point represent the same position point on the second device.

In the present disclosure, the first device may photograph a single image, that is the first image, or it may photograph images continuously, with the first image being one frame of the consecutive a plurality of frames of image. When the first device photographs images continuously, the first image may be the first frame of image, or a frame of image generated after the first frame of image. In such a case, there are preceding frames of image before the first image is generated. For example, if the first image is the fifth frame of image, the preceding frames of image include the first to the fourth frames of image, and the fourth frame of image is the previous frame of image of the first image.

In an example of the present disclosure, when the first image is not the first frame of image, the preceding frames of image of the first image and the first image may be consecutive frames of image, and each preceding frame of image may also include the second device. The consecutive frames of image may record the change in the position of the second device continuously, which continuously changes in the consecutive frames of image. Based on this, the current position of the 2D points of the second device in the first image may be determined by searching in the first image according to the position of the second device in the preceding frames of image of the first image.

In this example, the preceding frame of image used may be the previous frame of image of the first image, or may include a plurality of consecutive preceding frames of image, which are consecutive frames of image with the first image. The position of the second device in the preceding frames of image can be determined. When the preceding frames of image used include a plurality of frames of image, the corresponding position of the second device can be determined from each frame of image in the preceding frames of image. The following is an illustration with one of the preceding frames of image as an example.

The estimated moving range of the first device can be determined according to the preset moving speed of the first device and the position of the second device in the preceding frames of image. The preset moving speed of the first device can be acquired by the IMU in the first device.

After determining the preset moving speed of the first device by the IMU in the first device, the time interval between the image frames can be determined. The preset moving speed is multiplied by the time interval to obtain the moving distance of the first device from the moment of the preceding frame of image to the moment of the first image. The moving distance may be equivalent to the distance between the position of the second device in the preceding frame of image and its position in the first image.

The estimated moving range of the first device can be determined according to the moving distance of the first device and the position of the second device in the preceding frame of image. The range of a circle determined with the position of the second device in the preceding frame of image as the center and the moving distance of the first device as the radius is the estimated moving range of the first device.

The current position of the 2D points of the second device in the first image can be determined by searching within the estimated moving range in the first image. For example, both the position of the second device in the preceding frame of image and the relative position of that position in the first image can be determined. For example, if the second device is located at the middle position in the preceding frame of image, then the relative position of the second device in the preceding frame of image in the first image is also at the middle position. Then, the current position of the 2D points of the second device in the first image is determined by searching within the estimated moving range in the first image with the determined relative position as the center.

In this example, the estimated moving range in the first image is smaller than the searching range of the whole first image. The searching range is narrowed, thereby reducing the amount of data processing, which in turn improves the efficiency of determining the 2D points of the second device in the first image.

In an example, the estimated moving range of the first device can be determined according to the preset moving speed of the first device, the moving direction, and the position of the second device in the preceding frame of image.

In this example, the moving direction of the first device may be acquired by the IMU on the first device. The moving direction of the first device is the moving direction in space, and the moving direction of the first device is opposite to the moving direction of the second device in the image captured by the first device. For example, the first device moves upwards in space, the second device moves downwards on the image captured by the first device. For example, the position of the second device in the first image moves downwards relative to its position in the preceding frame of image.

Based on the moving direction of the first device, the determined estimated moving range may be in the direction opposite to the moving direction of the first device based on the position of the second device in the preceding frame of image. Therefore, the estimated moving range is further narrowed, which further narrows the searching range.

In another example of the present disclosure, the relative position between the second device and the first device can be determined according to the position of the second device in the world coordinate system and the position of the first device in the world coordinate system, where the relative position is relative to the world coordinate system.

The estimated range of the 2D points of the second device in the first image can be calculated according to the relative position between the second device and the first device. For example, the relative distance between the second device and the first device can be determined according to the relative position between the second device and the first device. The photographing orientation of the camera on the first device can be determined according to the pose of the first device and the position of the camera on the first device. The photographing range of the camera can be determined according to the photographing orientation of the camera and the field of view of the camera, which may be a conical region range with the camera as the vertex. Within the photographing range of the camera, at positions with different distances from the first device, the planes within which the positions lie, parallel to the lens plane of the camera, exhibit varying planar photographing ranges. The greater the distance from the first device, the greater the planar photographing range. The planar photographing range of the plane within which the second device lies can be determined according to the relative distance between the second device and the first device and the photographing range of the camera. The position of the second device in the planar photographing range can be determined according to the determined planar photographing range and the position of the second device in space. The range determined by the position of the second device in the planar range and the specified distance with that position as the center can be determined as the estimated range of the 2D points of the second device in the first image.

After determining the estimated range of the 2D points of the second device in the first image, the current position of the 2D points of the second device in the first image can be determined by searching within the estimated range in the first image.

Based on the two examples above, by estimating the range of the 2D points of the second device in the first image, it is only necessary to searching within the estimated range in the first image, thereby narrowing the local searching range and reducing the amount of data processing, which in turn improves the efficiency of determining the 2D points of the second device in the first image.

Back to FIG. 2, in 230, feature point matching is performed between 2D points of the second device and 3D points on a 3D model of the second device using descriptors corresponding to the 3D points on the 3D model of the second device and descriptors corresponding to the 2D points, to obtain a first correspondence between at least three non-collinear 2D points of the second device and the 3D points on the 3D model of the second device.

In the present disclosure, the 3D points on the 3D model corresponding to the individual 2D points on the second device in the first image can be determined by means of feature point matching, where a first correspondence is constituted between the 2D points and the corresponding 3D points. By means of feature point matching, a correspondence between at least three non-collinear 2D points and 3D points can be determined.

For example, the second device is AR glasses, on which the three non-collinear position points may be: points A and B located at the bottom of two spectacle-frames and a point C located at the middle of a nose bridge. The 2D points on the second device in the first image for representing the position points at the bottom of the two spectacle-frames are A1 and B1, respectively, and the 2D point for representing the position point at the middle of the nose bridge is C1. The 3D points on the 3D model of the second device for representing the points at the bottom of the two spectacle-frames are A2 and B2, respectively, and the 3D point for representing the position point at the middle of the nose bridge is C2. A1 and A2 representing the points located at the bottom of the same spectacle-frame may constitute a first correspondence, B1 and B2 representing the points located at the bottom of the other same spectacle-frame may constitute another first correspondence, and C1 and C2 representing the points located at the middle of the nose bridge may constitute yet another first correspondence.

Figure 4:
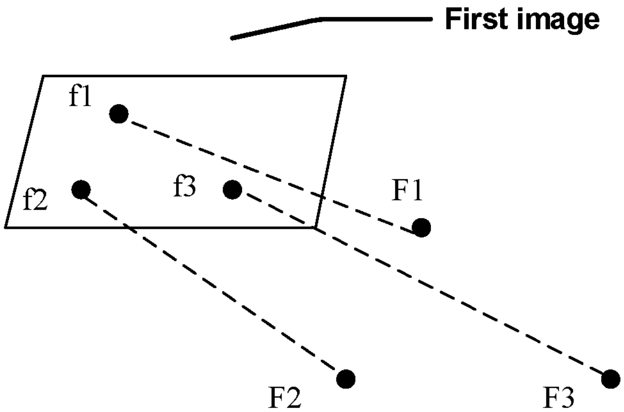
FIG. 4 shows a schematic diagram of an example of a mapping relationship between 2D points in a first image and 3D points on a 3D model according to the present disclosure.

FIG. 4 shows a schematic diagram of an example of the mapping relationship between the 2D points in the first image and the 3D points of the 3D model according to the present disclosure. As shown in FIGS. 4, F1, F2 and F3 are 3D points on the 3D model, f1, f2 and f3 are 2D points of the second device in the first image, and f1, f2 and f3 are not collinear. F1 and f1 characterize the same point located at the second device, and F1 and f1 map to each other in a first correspondence. F2 and f2 characterize the same point located at the second device, and F2 and f2 map to each other in a first correspondence. F3 and f3 characterize the same point located at the second device, and F3 and f3 map to each other in a first correspondence.

In an example, feature point matching can be performed according to the descriptors of the feature points. The descriptors of the individual 2D points on the second device in the first image can be used to determine the descriptors of the 3D points of the 3D model that match those descriptors. The 2D point and 3D point corresponding to the two descriptors that match each other, respectively, are matched to each other, and the 2D point and 3D point that match each other constitute a first correspondence. Two descriptors that are identical or similar may be considered mutually matched. In another example, the methods for feature point matching may include fast-orb, sift, etc.

It should be noted that the operational sequence of 210, 220 and 230 as described above may be not limited. The operations of 210, 220 and 230 may be performed in the sequence as shown in FIG. 2. Alternatively, one may choose to perform the operations of 220 and 230 first, followed by the operation of 210. Additionally, it is also possible to concurrently perform the operation of 210 while performing the operations of 220 and 230.

In 240, the localization of the 3D model of the second device in the world coordinate system is determined according to the localization of the second device in the world coordinate system and the second correspondence between the second device and the 3D model.

In the present disclosure, the localization of the second device in the world coordinate system may be a pose. Accordingly, the determined localization of the 3D model in the world coordinate system is a pose. It will be illustrated in detail below in conjunction with FIG. 5.

The localization of the second device in the world coordinate system may also be a position. Accordingly, the determined localization of the 3D model in the world coordinate system is a position. It will be illustrated in detail below in conjunction with FIG. 7.

It can be understood that, the second device can calculate the localization of the second device in the world coordinate system in real time from the data captured by its own sensor (IMU, camera, etc.).

In 250, the pose of the first device in the world coordinate system is determined according to the localization of the 3D model of the second device in the world coordinate system and the first correspondence.

The determined pose of the first device may be a pose of 6 DOF (degree of freedom), including six degrees of freedom of forward/backward, up/down, left/right, pitch, yaw, and roll. The use of a 6DOF pose to represent the spatial localization of the first device interacting with the second device improves the spatial localization accuracy of the first device.

Figure 5:
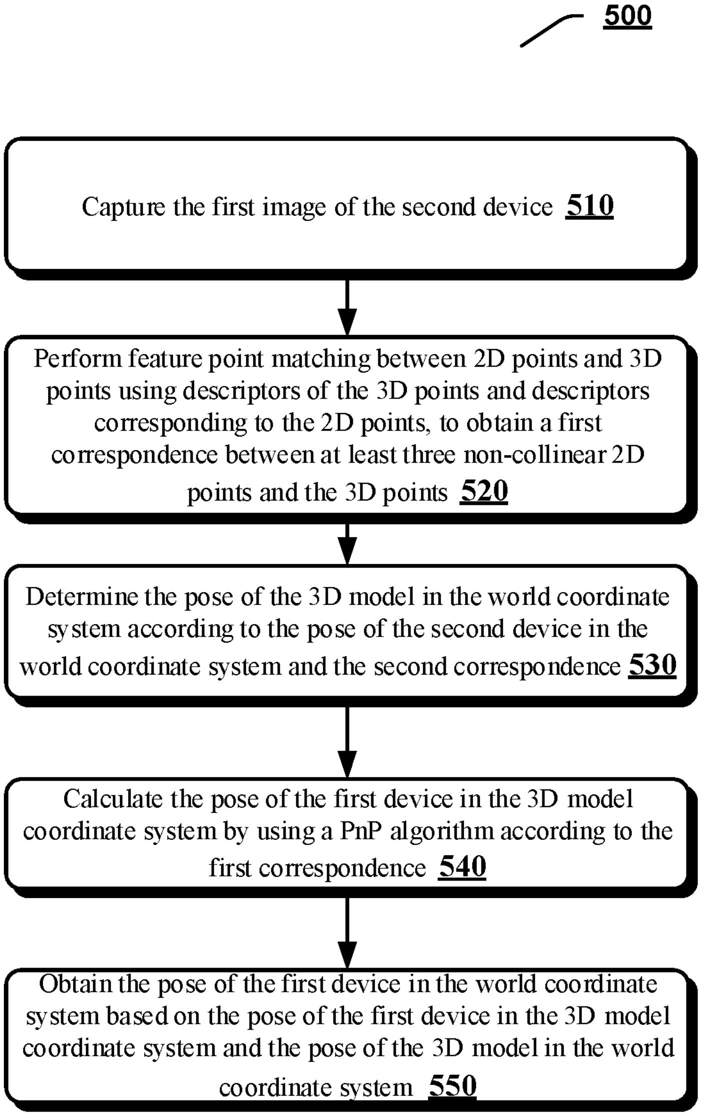
FIG. 5 shows a flow diagram of another example of a method for spatial localization according to the present disclosure.

FIG. 5 shows a flow diagram of another example 500 of the method for spatial localization according to the present disclosure. The method for spatial localization as shown in FIG. 5 may be performed by the first device.

As shown in FIG. 5, in 510, a first image of the second device is captured, and the first image includes 2D points of the second device and descriptors corresponding to the 2D points.

In 520, feature point matching is performed between the 2D points of the second device and 3D points on the 3D model of the second device using descriptors corresponding to the 3D points on the 3D model of the second device and descriptors corresponding to the 2D points, to obtain a first correspondence between at least three non-collinear 2D points of the second device and the 3D points on the 3D model of the second device.

The operations of 510 and 520 in FIG. 5 are similar to those of 220 and 230 in FIG. 2, respectively, and will not be described repeatedly here.

In 530, the pose of the 3D model of the second device in the world coordinate system is determined according to the pose of the second device in the world coordinate system and the second correspondence.

In the present disclosure, the second device may possess the computational capability of SLAM, enabling the second device to calculate the pose of the second device by means of SLAM. In an example, the second device may calculate the real-time pose of the second device in real time by means of SLAM, and the pose information of the second device can be directly acquired from the second device when needed. In another example, the second device can be triggered to perform the SLAM calculation, and does not perform the SLAM calculation when not triggered.

Figure 6:
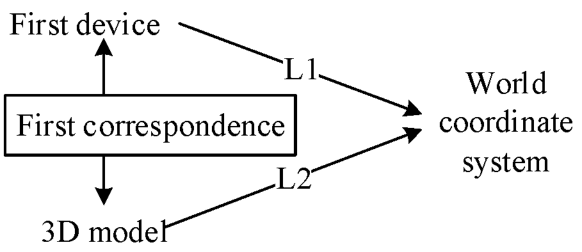
FIG. 6 shows a schematic diagram of an example of the relationship among a second device, a 3D model and a world coordinate system according to the present disclosure.

The second correspondence is a correspondence between the feature points on the second device and the 3D points on the 3D model of the second device. That is, the second correspondence is used to represent the correspondence between the second device and the 3D model. After acquiring the pose of the second device in the world coordinate system, the relationship among the second device, the 3D model and the world coordinate system can be determined based on the second correspondence and the pose of the second device in the world coordinate system. As shown in FIG. 6, a schematic diagram of an example of the relationship among the second device, the 3D model, and the world coordinate system according to the present disclosure is shown. As shown in FIG. 6, L1 represents the pose of the second device in the world coordinate system, L2 represents the pose of the 3D model in the world coordinate system, and L2 can be determined from L1 and the known second correspondence.

It should be noted that, the operation of 530 may be performed as a step in the method for spatial localization. That is, the operation of 530 is performed each time when the method for spatial localization is performed. In another example, the operation of 530 may be performed by other devices. For example, when the method for spatial localization of the present disclosure is performed by the first device, the operation of 530 can be performed by the second device, and when the first device needs the pose information of the 3D model in the world coordinate system, it may be acquired from the second device. When the method for spatial localization of the present disclosure is performed by the second device, the operation of 530 may be performed by the first device, and when the second device needs the pose information of the 3D model in the world coordinate system, it may be acquired from the first device. In addition, the operation of 530 may also be performed by a device other than the second device and the first device.

In 540, the pose of the first device in the 3D model coordinate system is calculated by using a perspective-n-point (PnP) algorithm according to the first correspondence.

In the present disclosure, the first correspondence is the correspondence between the 2D points in the first image and the 3D points on the 3D model.

In the present disclosure, the PnP algorithm may include a P3P algorithm, an efficient PnP (EPnP) algorithm, an algebraic solution to the perspective-three-point (aP3P) algorithm, etc. In an example, the PnP algorithm used in the present disclosure may be a PnP algorithm based on the least squares method (LS).

Based on the known first correspondence, at least three pairs of 2D points and 3D points conforming to the first correspondence can be obtained. By using the PnP algorithm, the pose of the first device in the 3D model coordinate system can be calculated according to the coordinates of the 2D points in the camera coordinate system and the coordinates of the 3D points in 3D model coordinate system.

In an example, interior points can be determined from the first correspondence between at least three non-collinear 2D points of the second device in the first image and the 3D points on the 3D model of the second device by using an RANSAC (Random Sample Consensus) algorithm.

A plurality of interior points are randomly assumed as initial values among all the points of the first correspondence, and the plurality of interior points are fit into a model, which is adapted for the plurality of interior points used as the initial values, and the parameters of the model are calculated from the plurality of interior points. Other feature points in the first correspondence are tested using the model. If one of the other feature points is adapted for the model, it can be determined that the feature point is an interior point; otherwise, it may be considered that the feature point is not an interior point. In this way, the number of interior points can be expanded. After all the feature points are tested, all the feature points determined as the interior points are used for the reassessment of the model, so as to update the model. The assessment can be performed by the error rate of the model. The process above is an iteration process. After several iterations, in each iteration process, if there are too few internal points, not as good as the model in the previous iteration, the model of this iteration can be abandoned. If the model produced by the iteration is better than the model of the previous iteration, the model of this iteration can be retained and goes on for the next iteration.

After determining the interior points, the pose of the first device in the 3D model coordinate system of the second device can be calculated from the interior points by using the PnP algorithm.

By using the RANSAC algorithm in this example, the feature points with a higher matching degree can be screened from all the feature points that match the feature points in the first correspondence as the interior points. The interior points screened by the RANSAC algorithm have a higher matching degree with the feature points; moreover, fewer feature points are used in the PnP algorithm, which reduces the amount of data to be calculated while improving the accuracy of pose calculation.

Back to FIG. 5, in 550, the pose of the first device in the world coordinate system is obtained based on the pose of the first device in the 3D model coordinate system of the second device and the pose of the 3D model of the second device in the world coordinate system.

In the present disclosure, the 3D model coordinate system is created according to the 3D model, where the 3D model coordinate system has a fixed relative position relationship with the 3D model. According to the pose of the first device in the 3D model coordinate system and the relative position relationship between the 3D model coordinate system and the 3D model, the pose of the first device relative to the 3D model can be determined. Based on the pose of the first device relative to the 3D model and the pose of the 3D model in the world coordinate system, the pose of the first device in the world coordinate system can be obtained.

Figure 7:
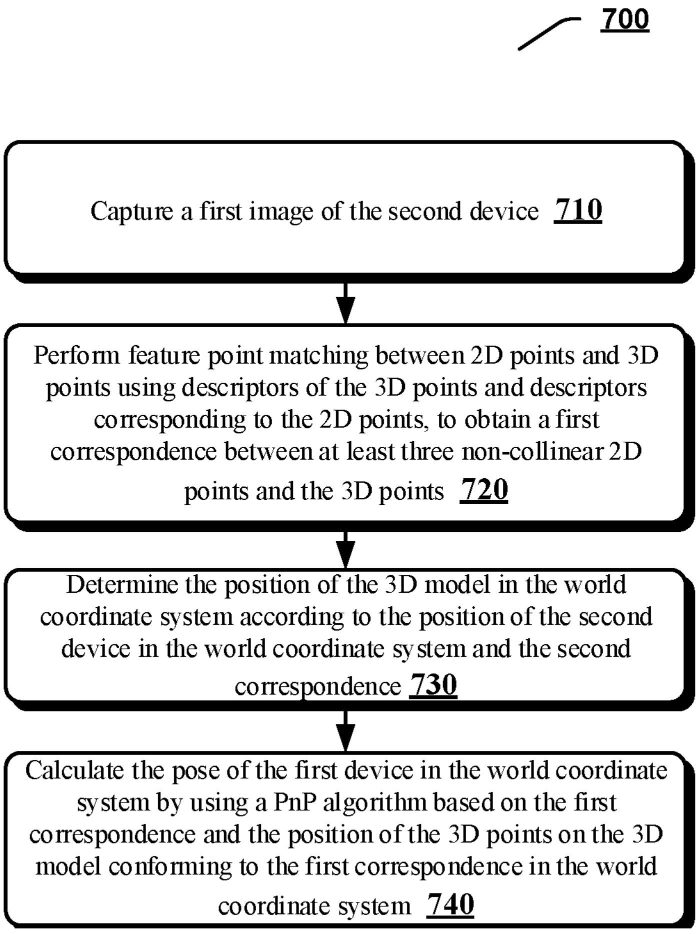
FIG. 7 shows a flow diagram of another example of a method for spatial localization according to the present disclosure.

FIG. 7 shows a flow diagram of another example 700 of the method for spatial localization according to the present disclosure. The method for spatial localization as shown in FIG. 7 may be performed by the first device.

As shown in FIG. 7, in 710, a first image of the second device is captured, and the first image includes 2D points of the second device and descriptors corresponding to the 2D points.

In 720, feature point matching is performed between the 2D points of the second device and 3D points on the 3D model of the second device using descriptors corresponding to the 3D points on the 3D model of the second device and descriptors corresponding to the 2D points, to obtain a first correspondence between at least three non-collinear 2D points of the second device and the 3D points on the 3D model of the second device.

The operations of 710 and 720 in FIG. 7 are similar to those of 220 and 230 in FIG. 2, respectively, and will not be described repeatedly here.

In 730, the position of the 3D points on the 3D model of the second device in the world coordinate system is determined according to the position of the second device in the world coordinate system and the second correspondence.

In this example, the position of the second device in the world coordinate system may include three degrees of freedom of forward/backward, up/down, left/right. For example, in a rectangular coordinate system, the position of the second device may be represented by the values on the X axis, Y axis, and the Z axis.

In this example, the second device may have a capacity of localization, such as, localization by means of GPS, BeiDou, etc. The second device can acquire its own position information in the world coordinate system by localization.

After determining the position of the 3D model in the world coordinate system, in 740, the pose of the first device in the world coordinate system is calculated by using the PnP algorithm according to the first correspondence and the position of the 3D points on the 3D model of the second device conforming to the first correspondence in the world coordinate system.

In this example, the 3D points targeted by the PnP algorithm are all referenced to the world coordinate system, and thus the resulting pose of the first device is also referenced to the world coordinate system. In an example, the PnP algorithm used may be a PnP algorithm based on the least squares method (LS).

In an example, for all or part of the 3D points in the first correspondence, their positions in the world coordinate system can be determined. The PnP algorithm is conducted for the 3D points referenced to the world coordinate system to obtain the pose of the first device in the world coordinate system.

In an example, before performing the operation of 740, interior points can be determined from the first correspondence between at least three non-collinear 2D points of the second device in the first image and the 3D points on the 3D model of the second device by using the RANSAC algorithm. The determined interior points are determined as the points to be used when the first correspondence is applied to the PnP algorithm. That is, the pose of the first device in the world coordinate system is calculated by using the PnP algorithm according to the first correspondence of the determined interior points and the position of the interior points in the 3D points on the 3D model of the second device in the world coordinate system.

In an example of the present disclosure, when the first device cannot photograph a first image including the second device, it can be determined that the first image captured by the first device does not include at least three non-collinear 2D points of the second device. In addition, if the first device can photograph a first image including the second device, there are less than three 2D points of the second device in the photographed first image, or no less than three 2D points of the second device in the first image are collinear, it can be determined that the first image captured by the first device does not include at least three non-collinear 2D points of the second device.

When the first image captured by the first device does not include at least three non-collinear 2D points of the second device, the first device may photograph a second image including a specified object. The second image may include 2D points of the specified object that can serve as key points, and the specified object is in a fixed relative position to the second device. For example, the above "second image" can also be referred to as a "specified object image".

In an example, the second device may include a head-mounted device, where the specified object may include human faces. When a user wears a head-mounted device, the head-mounted device is in a fixed relative position to the user's face. In another example, the specified object may further include a specified organ on the human face, e.g., eyes, nose, ears, mouth, etc.

In an example, the human face included in the specified object may include a generic face. When the generic face is used to create a 3D face model of the users who use the head-mounted device, the generic 3D face model can be used regardless of who is wearing the head-mounted device, which may save the operation of modeling the face of the user. In another example, the human face included in the specified object may include the face of a specified user, and the specified user may be the user who uses the second device. That is, it is necessary to create a dedicated 3D face model for each user who wears the head-mounted device.

In this example, a 3D model of the specified object may be pre-created and stored. In an example, the stored 3D model may include 3D points and corresponding descriptors.

Since the specified object is in a fixed position relative to the second device, a pre-stored relative position relationship between the 3D model of the specified object and the 3D model of the second device can be established based on the relative position. For example, the second device is a head-mounted device, the specified object is human face, when a user wears the head-mounted device, the relative position offset between the human face and the head-mounted device is L, it can be determined that the position offset between the 3D model of the human face and the 3D model of the head-mounted device is L1. After calculating the position or pose of the 3D model of the head-mounted device in the world coordinate system, the position or pose of the 3D model of the human face in the world coordinate system can be calculated from L1.

At least three non-collinear 2D points of a specified object in the second image are detected for key points to obtain a matching relationship between the at least three non-collinear 2D points of the specified object and the 3D points on the 3D model of the specified object, thereby obtaining a third correspondence between the 3D model of the specified object and the second image.

In this example, key points of the specified object may be specified. For example, when the specified object is face, the specified key points on the face may include feature points at corners of the mouth, tip of the nose, or other positions.

After detecting 2D points corresponding to the key points on a specified object by means of key point detection, the 2D points corresponding to the key points can be matched with the 3D points on the 3D model of the specified object to establish a matching relationship.

In an example, the descriptors of 2D points corresponding to the individual key points in the second image can be matched with the descriptors of the individual 3D points on the 3D model of the specified object, where a 2D point and a 3D point with matched descriptors characterize the same key point on the specified object, and the 2D point and the 3D point constitute a matching relationship.

The matching relationships corresponding to the individual key points are combined to obtain a third correspondence between the 3D model of the specified object and the second image.

Based on the above example, when the second device cannot be photographed, or the first image captured by the first device does not include at least three non-collinear 2D points of the second device, the pose of the first device in the world coordinate system can be calculated by photographing the specified object in a fixed position relative to the second device, thereby improving the robustness of spatial localization.

In another example of the present disclosure, when the first image captured by the first device includes the specified object and the second device, the first image may include 2D points of the specified object that can serve as the key points. The specified object is in a fixed position relative to the second device.

In this example, at least three non-collinear 2D points of the specified object in the second image are detected for key points to obtain a matching relationship between the at least three non-collinear 2D points of the specified object and 3D points on the 3D model of the specified object. The 3D model of the specified object includes 3D points and key points corresponding to the 3D points. The resulting matching relationship is a matching relationship for the key points of the specified object.

After obtaining the matching relationship corresponding to the key points, the PnP algorithm can be used to calculate the pose of the first device in the 3D model coordinate system of the second device according to the first correspondence and the matching relationship, and then obtain the pose of the first device in the world coordinate system based on the pose of the first device in the 3D model coordinate system of the second device and the pose of the 3D model of the second device in the world coordinate system.

In an example, before using the PnP algorithm, the 3D model coordinate system of the specified object can be converted into the 3D model coordinate system of the second device according to the pre-stored relative position relationship between the 3D model of the specified object and the 3D model of the second device, thereby unifying the 3D models of the specified object and the second device in the 3D model coordinate system of the second device to facilitate the PnP algorithm.

Based on the above example, the pose calculated by using the second device and the pose calculated by using the specified object can be combined to get a more accurate pose.

In an example of the present disclosure, the first device may be provided with an IMU, by which the first device can capture the IMU data in real time. The first device can calculate the pose of the first device in the world coordinate system (hereinafter referred to as pose a) in real time by using the captured IMU data.

The poses of the first device are different at different moments, so the pose a calculated according to the IMU data at different moments may be different.

The first device, when photographing the first image, can calculate a current pose a according to the currently captured IMU data. Then, the pose of the first device in the world coordinate system (hereinafter referred to as pose b) is determined from the first image according to an embodiment of the present disclosure. Pose a and pose b are fused to obtain the pose of the first device. The means for fusion may include averaging and the like.

In an example, the captured IMU data may also be directly fused with the pose of the first device in the world coordinate system determined according to the first image.

In this example, the pose is calculated by fusion in two different ways, improving the pose accuracy of the first device. In addition, the IMU data is continuous, while the poses determined from the first image are intermittent. The pose calculated from the IMU data can be fused based on the pose obtained by the method of the present disclosure to obtain a pose of higher frequency, thus reducing the data delay.

Figure 8:
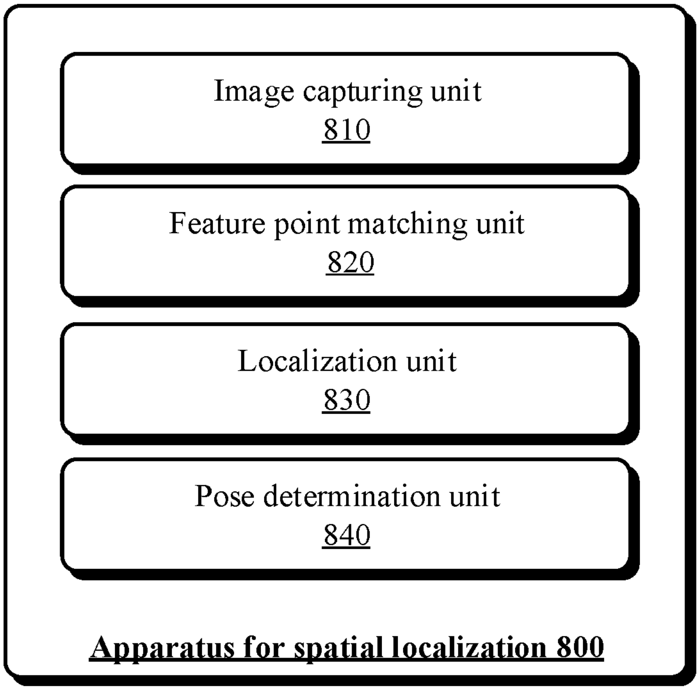
FIG. 8 shows a block diagram of an example of an apparatus for spatial localization according to the present disclosure.

FIG. 8 shows a block diagram of an example of the apparatus for spatial localization 800 according to the present disclosure. The apparatus for spatial localization 800 may be applied to the first device.

As shown in FIG. 8, the apparatus for spatial localization 800 includes an image capturing unit 810, a feature point matching unit 820, a localization unit 830, and a pose determination unit 840.

The image capturing unit 810 is configured to capture the first image of the second device, and the first image includes 2D points of the second device and descriptors corresponding to the 2D points.

The feature point matching unit 820 is configured to perform feature point matching between the 2D points of the second device and 3D points on the 3D model of the second device using descriptors corresponding to the 3D points on the 3D model of the second device and descriptors corresponding to the 2D points, so as to obtain a first correspondence between at least three non-collinear 2D points of the second device and the 3D points on the 3D model of the second device, and the 3D model of the second device includes 3D points and descriptors corresponding to the 3D points.

The localization unit 830 is configured to determine the localization of the 3D model of the second device in the world coordinate system according to the localization of the second device in the world coordinate system and a second correspondence between the second device and the 3D model.

The pose determination unit 840 is configured to determine the pose of the first device in the world coordinate system according to the localization of the 3D model of the second device in the world coordinate system and the first correspondence.

In an example, the apparatus for spatial localization 800 further includes a key point matching unit. The image capturing unit is configured to, when the first image captured by the first device does not include at least three non-collinear 2D points of the second device, capture a second image including a specified object, the second image includes 2D points of the specified object that can serve as the key points, and the specified object is in a fixed relative position to the second device. The localization unit is configured to determine the localization of the 3D model of the specified object in the world coordinate system based on the localization of the 3D model of the second device in the world coordinate system and a pre-stored relative position relationship between the 3D model of the specified object and the 3D model of the second device, where the 3D model of the specified object includes 3D points and key points corresponding to the 3D points. The key point matching unit is configured to perform key point detection among at least three non-collinear 2D points of the specified object in the second image, so as to obtain a matching relationship between the at least three non-collinear 2D points of the specified object and 3D points on the 3D model of the specified object, thereby obtaining a third correspondence between the second image and the 3D model of the specified object. The pose determination unit is configured to determine the pose of the first device in the world coordinate system based on the localization of the 3D model of the specified object in the world coordinate system and the third correspondence.

In an example, the apparatus for spatial localization 800 further includes a key point matching unit. The key point matching unit is configured to perform key point detection among at least three non-collinear 2D points of a specified object in the second image, so as to obtain a matching relationship between the at least three non-collinear 2D points of the specified object and 3D points on the 3D model of the specified object, where the 3D model of the specified object includes 3D points and key points corresponding to the 3D points. The pose determination unit is configured to: calculate the pose of the first device in the 3D model coordinate system of the second device by using the PnP algorithm according to the first correspondence and the matching relationship; and obtain the pose of the first device in the world coordinate system based on the pose of the first device in the 3D model coordinate system of the second device and the pose of the 3D model of the second device in the world coordinate system.

In an example, the apparatus for spatial localization 800 further includes a coordinate system conversion unit. The coordinate system conversion unit is configured to convert the 3D model coordinate system of a specified object into the 3D model coordinate system of the second device according to the pre-stored relative position relationship between the 3D model of the specified object and the 3D model of the second device.

In an example, the image capturing unit is configured to: determine the position of the second device in a preceding frame of image; determine the estimated moving range of the first device according to the preset moving speed of the first device and the position of the second device in the preceding frame of image; and search within the estimated moving range in the first image to determine the current position of the 2D points of the second device in the first image.

In an example, the image capturing unit is configured to: determine the relative position between the second device and the first device according to the position of the second device in the world coordinate system and the position of the first device in the world coordinate system; calculate the estimated range of the 2D points of the second device in the first image from the relative position between the second device and the first device; and search within the estimated range in the first image to determine the current position of the 2D points of the second device in the first image.

Figure 9:
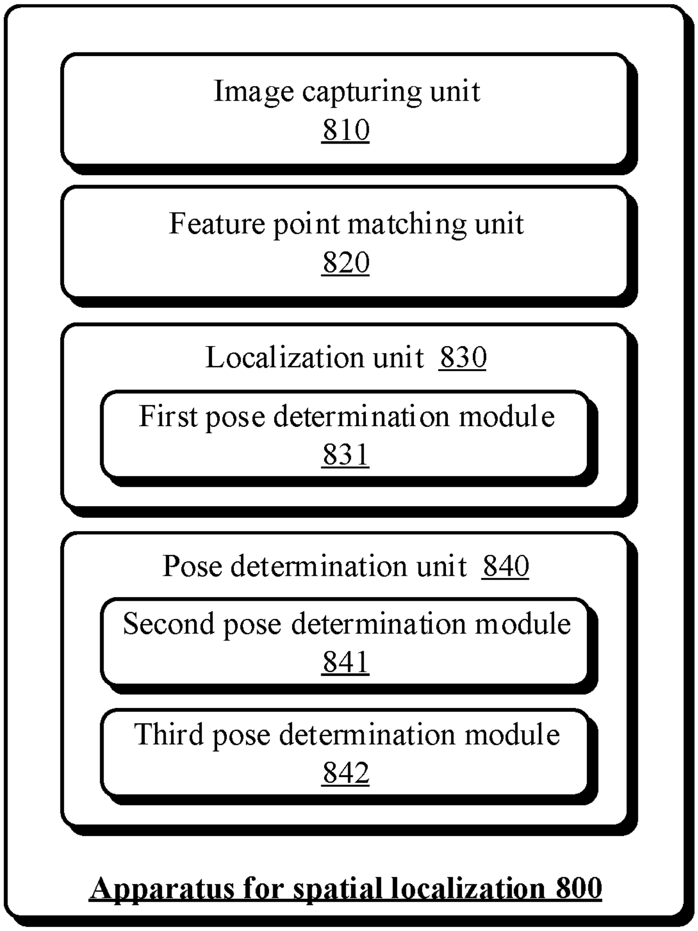
FIG. 9 shows a block diagram of another example of an apparatus for spatial localization according to the present disclosure.

FIG. 9 shows a block diagram of another example of the apparatus for spatial localization 800 according to the present disclosure.

As shown in FIG. 9, the localization unit 830 includes a first pose determination module 831. The pose determination module 831 is configured to: determine the pose of the 3D model of the second device in the world coordinate system according to the pose of the second device in the world coordinate system and the second correspondence.

The pose determination unit 840 includes a second pose determination module 841 and a third pose determination module 842. The second pose determination module 841 is configured to: calculate the pose of the first device in the 3D model coordinate system of the second device by using the PnP algorithm according to the first correspondence. The third pose determination module 842 is configured to: obtain the pose of the first device in the world coordinate system based on the pose of the first device in the 3D model coordinate system of the second device and the pose of the 3D model of the second device in the world coordinate system.

In this example, the pose determination module 831, the second pose determination module 841 and the third pose determination module 842 may be the same module or may also be different modules.

In an example, the apparatus for spatial localization 800 further includes an interior point determination unit. The interior point determination unit is configured to determine interior points from the first correspondence between at least three non-collinear 2D points of the second device in the first image and the 3D points on the 3D model of the second device by using the Random Sample Consensus algorithm; and determine the interior points as the points to be used when the first correspondence is applied in the PnP algorithm.

Figure 10:
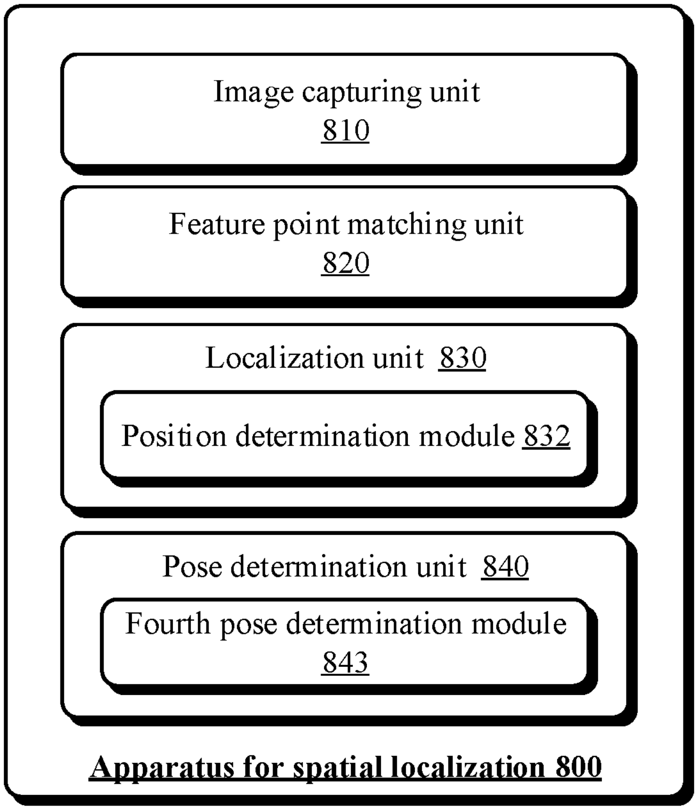
FIG. 10 shows a block diagram of another example of an apparatus for spatial localization according to the present disclosure.

FIG. 10 shows a block diagram of another example of the apparatus for spatial localization 800 according to the present disclosure.

As shown in FIG. 10, the localization unit 830 includes a position determination module 832. The position determination module 832 is configured to: determine the position of the 3D points on the 3D model of the second device in the world coordinate system according to the position of the second device in the world coordinate system and the second correspondence.

The pose determination unit 840 includes a fourth pose determination module 843. The fourth pose determination module 843 is configured to: calculate the pose of the first device in the world coordinate system by using the PnP algorithm according to the first correspondence and the position of the 3D points on the 3D model of the second device conforming to the first correspondence in the world coordinate system.

Embodiments of a method and apparatus for spatial localization according to the present disclosure are described above with reference to FIGS. 1 to 10.

The apparatus for spatial localization of the present disclosure can be implemented in hardware, and can also be implemented in software, or a combination of hardware and software. Using software implementation as an example, an apparatus in a logical sense is formed by reading, by a processor of a device where it is located, corresponding computer program instructions in a memory into an internal storage and running the same. In the present disclosure, the apparatus for spatial localization can be implemented, for example, by using an electronic device.

Figure 11:
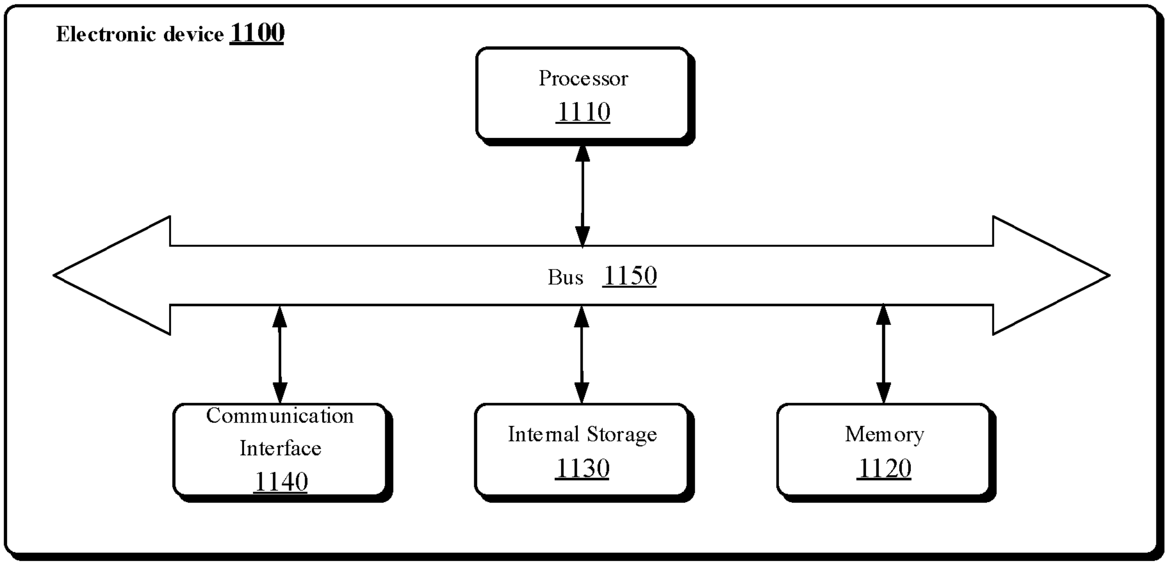
FIG. 11 shows a block diagram of an electronic device for performing a method for spatial localization according to an embodiment of the present disclosure.

FIG. 11 shows a block diagram of an electronic device 1100 that implements a method for spatial localization in an embodiment of the present disclosure.

As shown in FIG. 11, the electronic device 1100 includes at least one processor 1110, a memory (e.g., a nonvolatile memory) 1120, an internal storage 1130, and a communication interface 1140, and the at least one processor 1110, the memory 1120, the internal storage 1130 and the communication interface 1140 are connected together via a bus 1150. The at least one processor 1110 executes at least one computer readable instruction (i.e., an element implemented in software form as described above) stored or encoded in the memory.

In an embodiment, the memory stores computer-executable instructions which, when executed, cause the at least one processor 1110 to: acquire a first image of a second device, where the first image includes 2D points of the second device and descriptors corresponding to the 2D points; perform feature point matching between the 2D points of the second device and 3D points on the 3D model of the second device using descriptors corresponding to the 3D points on the 3D model of the second device and descriptors corresponding to the 2D points, to obtain a first correspondence between at least three non-collinear 2D points of the second device and the 3D points on the 3D model of the second device, where the 3D model of the second device includes 3D points and descriptors corresponding to the 3D points; determine a localization of the 3D model of the second device in a world coordinate system according to the localization of the second device in the world coordinate system and a second correspondence between the second device and the 3D model; and determine a pose of the first device in the world coordinate system according to the localization of the 3D model of the second device in the world coordinate system and the first correspondence.

It should be understood that, the computer-executable instructions stored in the memory, when executed, cause the at least one processor 1110 to perform the various operations and functions described above in conjunction with FIGS. 1 to 10 in embodiments of the present disclosure.

According to an embodiment, a program product such as a machine-readable medium is provided. The machine-readable medium may have instructions (i.e., elements implemented in software form as described above) which, when executed by a machine, cause the machine to perform the various operations and functions described above in conjunction with FIGS. 1 to 10 in embodiments of the present disclosure.

A system or apparatus with a readable storage medium can be provided, where software program codes implementing the functions of any of the above embodiments is stored on the readable storage medium, and a computer or processor of the system or apparatus is caused to read and execute the instructions stored in the readable storage medium.

In this case, the program codes read from the readable medium can themself implement the functions of any of the above embodiments, so the machine-readable codes and the readable storage medium storing the machine-readable codes form part of the present invention.

Computer program codes required for operations in sections of the present disclosure can be written in any one or more programming languages, including object-oriented programming languages such as Java, Scala, Smalltalk, Eiffel, JADE, Emerald, C++, C#, VB, NET, and Python, conventional procedural programming languages such as C language, Visual Basic 2003, Perl, COBOL 2002, PHP, and ABAP, dynamic programming languages such as Python, Ruby, and Groovy, or other programming languages. The program codes can be run on a user's computer, or run on a user's computer as an independent software package, or run partly on a user's computer and partly on a remote computer, or run entirely on a remote computer or server. In the latter case, the remote computer can be connected to a user's computer via any form of network, such as a local area network (LAN) or a wide area network (WAN), or connected to an external computer (e.g., via the Internet), or in a cloud computing environment, or used as a service, such as Software as a Service (Saas).

Embodiments of the readable storage medium include a floppy disk, a hard disk, a magnetic optical disk, an optical disk (e.g., CD-ROM, CD-R, CD-RW, DVD-ROM, DVD-RAM, DVD-RW, and DVD-RW), a magnetic tape, a non-volatile memory card, and an ROM. Optionally, the program codes may be downloaded from a server computer or from a cloud via a communication network.

Particular embodiments of the present disclosure are described above. Other embodiments are within the scope of the appended claims. In some cases, actions or steps recited in the claims can be performed in a sequence different from that in the embodiments, and still can achieve an expected result. Furthermore, the processes depicted in the accompanying drawings do not necessarily require the shown particular sequence or successive sequence so as to achieve an expected result. In some implementations, multitasking and parallel processing are also possible or may be advantageous.

Not all of the steps and units in the above processes and system structural diagrams are necessary, and some steps or units can be omitted depending on actual needs. The order of execution of the steps is not fixed and may be determined as needed. The apparatus structures described in the above embodiments can be physical structures, and may also be logical structures, i.e., some units may be implemented by the same physical entity, or some units may be implemented respectively by a plurality of physical entities, or may be implemented jointly by some components of a plurality of independent devices.

The term "exemplary" used throughout the present disclosure means "used as an example, instance or illustration" and does not mean "preferred" or "advantageous" over other embodiments. For the purpose of providing understanding of the described technology, specific implementations include specific details. However, the technology can be implemented without the specific details. In some examples, to avoid making the concepts in the described embodiments difficult to understand, commonly known structures and apparatuses are shown in the form of block diagrams.

Optional implementations of embodiments of the present disclosure are described above in detail in conjunction with the accompanying drawings. However, the embodiments of the present disclosure are not limited to the specific details in the above implementations. Within the scope of the technical conception of the embodiments of the present disclosure, various simple variations can be made to the technical solutions of the embodiments of the present disclosure, and these simple variations are all encompassed within the protection scope of the embodiments of the present disclosure.

The foregoing description of the present disclosure is provided to enable any person of ordinary skill in the art to implement or use the present disclosure. Various modifications to the present disclosure are obvious to those of ordinary skill in the art, and the general principles defined herein can also be applied to other variations without departing from the scope of protection of the present disclosure. Thus, the present disclosure is not limited to the examples and designs described herein, but is consistent with the broadest scope conforming to the principles and novelty features of the present disclosure.

What is claimed is:

1. A method for spatial localization, executed by a first device, the method comprising:

capturing a device image of a second device, the device image comprising 2D points of the second device and descriptors corresponding to the 2D points;

performing feature point matching between the 2D points of the second device and 3D points on a 3D model of the second device using descriptors corresponding to the 3D points on the 3D model of the second device and the descriptors corresponding to the 2D points, to obtain a first correspondence between at least three non-collinear 2D points of the second device and the 3D points on the 3D model of the second device, the 3D model of the second device comprising 3D points and descriptors corresponding to the 3D points;

determining a localization of the 3D model of the second device in a world coordinate system according to a localization of the second device in the world coordinate system and a second correspondence between the second device and the 3D model; and determining a pose of the first device in the world coordinate system according to the localization of the 3D model of the second device in the world coordinate system and the first correspondence.

2. The method according to claim 1, wherein, the localization of the second device in the world coordinate system comprises a pose, the determining a localization of the 3D model of the second device in a world coordinate system according to a localization of the second device in the world coordinate system and a second correspondence comprises:

determining a pose of the 3D model of the second device in the world coordinate system according to a pose of the second device in the world coordinate system and the second correspondence; and the determining a pose of the first device in the world coordinate system according to the localization of the 3D model of the second device in the world coordinate system and the first correspondence comprises:

calculating a pose of the first device in a 3D model coordinate system of the second device by using a PnP algorithm according to the first correspondence; and obtaining a pose of the first device in the world coordinate system based on the pose of the first device in the 3D model coordinate system of the second device and the pose of the 3D model of the second device in the world coordinate system.

3. The method according to claim 2, wherein, before using the PnP algorithm, the method further comprising:

determining interior points from the first correspondence between the at least three noncollinear 2D points of the second device in the device image and the 3D points on the 3D model of the second device by using a Random Sample Consensus algorithm; and determining the interior points as points to be used when the first correspondence is applied in the PnP algorithm.

4. The method according to claim 1, wherein, the localization of the second device in the world coordinate system comprises a position, the determining a localization of the 3D model of the second device in a world coordinate system according to a localization of the second device in the world coordinate system and a second correspondence comprises:

determining a position of the 3D points on the 3D model of the second device in the world coordinate system according to a position of the second device in the world coordinate system and the second correspondence; and the determining a pose of the first device in the world coordinate system according to the localization of the 3D model of the second device in the world coordinate system and the first correspondence comprises:

calculating a pose of the first device in the world coordinate system by using a PnP algorithm according to the first correspondence and the position of the 3D points on the 3D model of the second device according to the first correspondence in the world coordinate system.

5. The method according to claim 1, wherein, the second device comprises a head-mounted device configured to display a virtual object provided by the first device, the first device comprises a handheld device, the handheld device is configured to control the virtual object displayed by the head-mounted device and comprises a photographic device for capturing the device image.

6. The method according to claim 1, further comprising:

capturing a specified object image comprising a specified object when the device image captured by the first device does not comprise at least three non-collinear 2D points of the second device, the specified object image comprising 2D points of the specified object that serve as key points, and the specified object being in a fixed position relative to the second device;

determining a localization of a 3D model of the specified object in the world coordinate system based on the localization of the 3D model of the second device in the world coordinate system and a pre-stored relative position relationship between the 3D model of the specified object and the 3D model of the second device, wherein, the 3D model of the specified object comprises 3D points and key points corresponding to the 3D points;

detecting key points among the at least three non-collinear 2D points of the specified object in the specified object image, to obtain matching relationship between the at least three non-collinear 2D points of the specified object and 3D points on the 3D model of the specified object, to obtain a third correspondence between the specified object image and the 3D model of the specified object;

determining the pose of the first device in the world coordinate system based on the localization of the 3D model of the specified object in the world coordinate system and the third correspondence.

7. The method according to claim 1, wherein, the device image further comprises a specified object and 2D points of the specified object that serve as key points, and the specified object is in a fixed position relative to the second device, the method further comprising:

detecting key points among the at least three non-collinear 2D points of the specified object in the device image, to obtain matching relationship between the at least three non-collinear 2D points of the specified object and 3D points on a 3D model of the specified object, wherein, the 3D model of the specified object comprises the 3D points and key points corresponding to the 3D points; and the determining a pose of the first device in the world coordinate system according to the localization of the 3D model of the second device in the world coordinate system and the first correspondence comprises:

calculating a pose of the first device in a 3D model coordinate system of the second device by using a PnP algorithm according to the first correspondence and the matching relationship; and obtaining a pose of the first device in the world coordinate system based on the pose of the first device in the 3D model coordinate system of the second device and a pose of the 3D model of the second device in the world coordinate system.

8. The method according to claim 7, wherein, before calculating a pose of the first device in a 3D model coordinate system of the second device by using a PnP algorithm according to the first correspondence and the matching relationship, the method further comprising:

converting a 3D model coordinate system of the specified object into a 3D model coordinate system of the second device according to a pre-stored relative position relationship between the 3D model of the specified object and the 3D model of the second device.

9. The method according to claim 7, wherein, when the second device comprises a head-mounted device, the specified object comprises a human face.

10. The method according to claim 1, wherein, the capturing a device image of a second device comprises:

determining a position of the second device in a preceding frame of image;

determining an estimated moving range of the first device according to a preset moving speed of the first device and a position of the second device in the preceding frame of image; and searching within the estimated moving range in the device image, to determine a current position of the 2D points of the second device in the device image.

11. The method according to claim 10, wherein, the determining an estimated moving range of the first device according to a preset moving speed of the first device and a position of the second device in the previous frame of image comprises:

determining an estimated moving range of the first device according to a preset moving speed and a moving direction acquired by an inertia measurement unit of the first device, as well as a position of the second device in the previous frame of image.

12. The method according to claim 1, wherein, the capturing a device image of a second device comprises:

determining a relative position between the second device and the first device according to a position of the second device in the world coordinate system and a position of the first device in the world coordinate system;

calculating an estimated range of 2D points of the second device in the device image according to the relative position between the second device and the first device; and searching within the estimated range in the device image, to determine a current position of the 2D points of the second device in the device image.

13. The method according to claim 1, wherein, the determining a localization of the 3D model of the second device in the world coordinate system according to a localization of the second device in the world coordinate system and a second correspondence between the second device and the 3D model comprises:

calculating a localization of the second device in the world coordinate system in real time from data captured by the second device, acquiring a preset second correspondence between the second device and the 3D model, determining a localization of the 3D model of the second device in the world coordinate system.

14. An electronic device, comprising: at least one processor, and a memory coupled to the at least one processor, wherein the memory stores instructions which, when executed by the at least one processor, cause the at least one processor to perform a method for localizing a first device, the method comprises:

capturing a device image of a second device by a first device, the device image comprising 2D points of the second device and descriptors corresponding to the 2D points;

performing feature point matching between the 2D points of the second device and 3D points on a 3D model of the second device using descriptors corresponding to the 3D points on the 3D model of the second device and descriptors corresponding to the 2D points, to obtain a first correspondence between the 2D points of the second device and the 3D points on the 3D model of the second device;

calculating a first pose of the first device in the 3D model coordinate system of the second device according to the first correspondence;

determining a pose of the 3D model of the second device in a world coordinate system according to a pose of the second device in the world coordinate system and a second correspondence between the second device and the 3D model;

determining a second pose of the first device in the world coordinate system according to the pose of the 3D model of the second device in the world coordinate system and the first pose.

15. The electronic device according to claim 14, wherein, the capturing a device image of a second device by a first device comprises:

determining a position of the second device in a preceding frame of image;

determining an estimated moving range of the first device according to a preset moving speed of the first device and a position of the second device in the preceding frame of image; and searching within the estimated moving range in the device image, to determine a current position of the 2D points of the second device in the device image.

16. The electronic device according to claim 15, wherein, the determining an estimated moving range of the first device according to a preset moving speed of the first device and a position of the second device in the previous frame of image comprises:

determining an estimated moving range of the first device according to a preset moving speed and a moving direction acquired by an inertia measurement unit of the first device, as well as a position of the second device in the previous frame of image.

17. The electronic device according to claim 14, wherein, the capturing a device image of a second device by a first device comprises:

determining a relative position between the second device and the first device according to a position of the second device in the world coordinate system and a position of the first device in the world coordinate system;

calculating an estimated range of 2D points of the second device in the device image according to the relative position between the second device and the first device; and searching within the estimated range in the device image, to determine a current position of the 2D points of the second device in the device image.

18. The electronic device according to claim 14, wherein, the determining a pose of the 3D model of the second device in the world coordinate system according to a pose of the second device in the world coordinate system and a second correspondence between the second device and the 3D model comprises:

calculating a pose of the second device in the world coordinate system in real time from data captured by the second device, acquiring a preset second correspondence between the second device and the 3D model, determining a pose of the 3D model of the second device in the world coordinate system.

19. A nonvolatile computer readable storage medium, with a computer program stored therein, wherein the computer program, when executed by a processor, causes the processor to perform a method for determining a pose of a handheld device, the handheld device being communicatively connected to a head-mounted device, and is configured to provide virtual objects to be displayed to the head-mounted device and to control the virtual objects displayed by the head-mounted device, the method comprises:

capturing a first image of the head-mounted device by the handheld device, the first image comprising 2D points of the head-mounted device and descriptors corresponding to the 2D points;

performing feature point matching between the 2D points of the head-mounted device and 3D points on the 3D model of the head-mounted device using descriptors corresponding to the 3D points on the 3D model of the head-mounted device and the descriptors corresponding to the 2D points, to obtain a first correspondence between 2D points of the head-mounted device and the 3D points on the 3D model of the head-mounted device, the 3D model of the head-mounted device comprising the 3D points and the descriptors corresponding to the 3D points;

determining a pose of the 3D model of the head-mounted device in a world coordinate system according to a pose of the head-mounted device in the world coordinate system and a second correspondence between the head-mounted device and the 3D model;

determining a pose of the handheld device in the world coordinate system according to the pose of the 3D model of the head-mounted device in the world coordinate system and the first correspondence.

20. The nonvolatile computer readable storage medium according to claim 19, wherein, the determining a pose of the 3D model of the head-mounted device in the world coordinate system according to a pose of the head-mounted device in the world coordinate system and a second correspondence between the head-mounted device and the 3D model comprises:

calculating a pose of the head-mounted device in the world coordinate system in real time from data captured by the head-mounted device, acquiring a preset second correspondence between the head-mounted device and the 3D model, determining a pose of the 3D model of the head-mounted device in the world coordinate system.

* * * * *